Feb. 26, 1963  W. L. BURRISS  3,078,668
GAS GENERATOR REGULATING SYSTEM
Filed Feb. 2, 1959
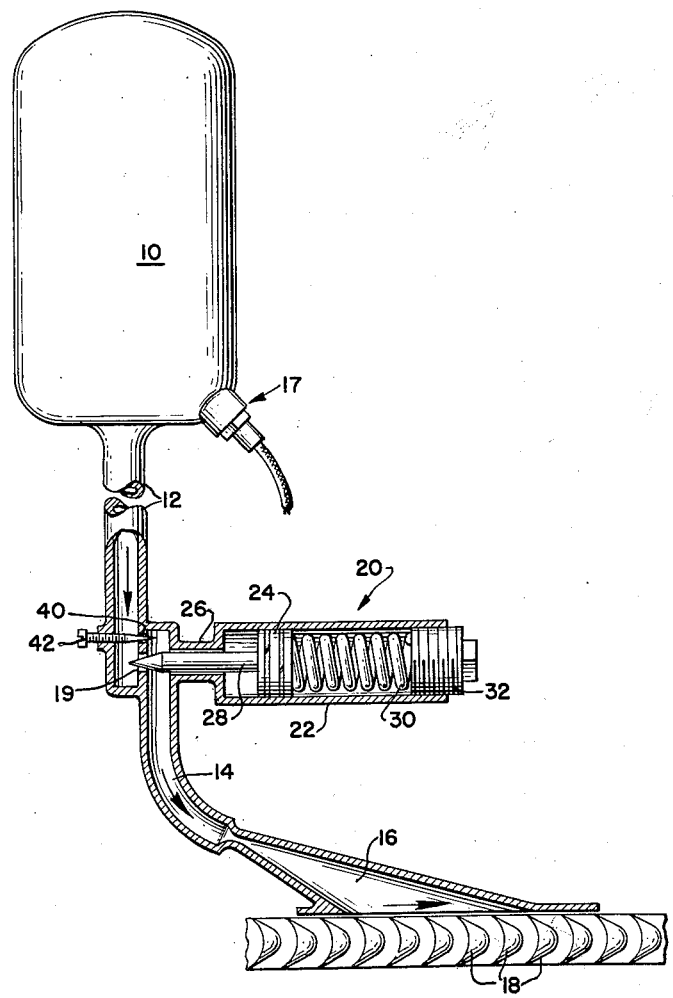
INVENTOR:
WILLIAM L. BURRISS,
BY
Attorney.

United States Patent Office 3,078,668
Patented Feb. 26, 1963

3,078,668
GAS GENERATOR REGULATING SYSTEM
William L. Burriss, Inglewood, Calif., assignor to The Garrett Corporation, Los Angeles, Calif., a corporation of California
Filed Feb. 2, 1959, Ser. No. 790,671
8 Claims. (Cl. 60—39.25)

This invention relates to gas generator regulating systems and more particularly to gas generator regulating systems for solid propellant propulsion devices.

It is often desirable to employ solid propellant propulsion devices to provide power because of their compactness and simplicity in operation. These devices have many applications including primary and auxiliary or secondary power plants for aircraft. Some auxiliary propulsion systems on aircraft provide improved performance including speed, rate of climb, ceiling altitudes and increased maneuverability at high altitudes. More commonly, propulsion systems are provided for aircraft to assist in the take-off by providing additional power during that period. In this manner, aircraft is capable of taking off with heavier loads and clear obstacles on shorter runways. Auxiliary equipment on aircraft or other vehicles is powered by solid propulsion devices in many instances, converting the power output of the device to torque by a turbine driven by the reaction gases passed by a turbine nozzle. A pump or alternator, for example, can be coupled to the turbine through a drive shaft and suitable reduction gearing if necessary.

Other applications of solid propellant propulsion devices include rocket projectiles which are essentially unguided missiles fired from a launching rack and guided missiles which are similar to rocket projectiles but are usually larger and their flight path is controlled by an automatic mechanism or pilot.

A typical solid propellant device includes a propellant combustion chamber, an exhaust or turbine nozzle and an igniter. The physical mass or body of the propellant, referred to as the charge or grain, is housed in the combustion chamber. The propellant charge contains all the necessary ingredients for sustaining chemical combustion and once ignited, the charge will burn on all exposed surfaces. Since the area of the exposed surfaces can be controlled by the geometrical form of the propellant grain, the burning characteristics of the propulsion device including operating pressure, thrust and duration or burning period are determined, to a great extent, by the geometrical form selected. Treatment of solid propellants specifically in the disclosure is not intended to restrict the invention thereto but only to facilitate the description since solid propellants are commonly used in propulsion devices of the type described herein. Semi-solid and even liquid propellants are intended to be included therefore where the principles of the invention are applicable.

A disadvantage of solid propellant propulsion units is that propellants have certain limitations which prevent wider application of them in different fields. It has been shown that the initial temperature of the propellant grain will materially affect the performance of a propulsion unit. As a result of varying ambient temperatures affecting the temperature of the propellant prior to combustion, the propulsion unit, without regulating controls, will operate at a higher chamber pressure and thrust with higher ambient temperatures. At these higher temperatures, the firing duration or burning period will be shorter, although the total impulse will not be changed appreciably. The foregoing indicates that the initial temperature of the grain has a decided effect on the burning rate, and that ambient temperature variations produced by weather conditions must be considered where exacting performance requirements are to be met.

In order to avoid the foregoing disadvantages, including the establishment or maintaining the grain temperature at a preselected point for operation of propulsion devices, the present invention provides for regulation of the operating characteristics of the devices by controlling the pressure in the combustion chamber to regulate the burning rate.

It is an object therefore of the present invention to provide for the regulation of the power output of solid propellant gas generators having the foregoing features and advantages.

Another object of the present invention is to regulate the burning rate of a propellant in a gas generator by controlling the flow of reaction gases and the pressure in the combustion chamber of the generator.

A further object is to provide for the control of the flow of reaction gases from a solid propellant gas generator in order to regulate the pressure in the combustion chamber. The pressure regulation compensates for variations in soak temperatures of the propellant from desired soak temperatures to maintain the desired burning rate and weight flow of the propellant from the gas generator.

Still another object of the invention is the provision of a regulating system for controlling the pressure in a combustion chamber of a solid propellant gas generator to compensate for temperature variations of the solid propellant at the time of combustion, whereby a preselected burning rate weight flow of the solid propellant is maintained.

A further object of the invention is to provide an arrangement for maintaining a constant burning rate in the combustion chamber of a solid propellant gas generator over a range of soak temperatures by regulating the pressure in the combustion chamber compensating for variations in the soak temperature at the instant of ignition.

A further object is to provide a regulating means for solid propellant gas generators including means for controlling the pressure in the inlet of an exhaust nozzle connected to an outlet in a combustion chamber of a gas generator wherein the flow of gases from the chamber is controlled to regulate the pressure in the combustion chamber to maintain a substantially constant burning rate of the propellant at different initial soak temperatures.

Still another object is to provide an arrangement for compensating for soak temperature variations of a solid propellant in a gas generator wherein the soak temperature variations tend to produce variations in the burning rate including means for controlling the flow of gases from the combustion chamber of a gas generator directly with pressure in an inlet to an exhaust nozzle thereby varying the pressure in the combustion chamber inversely with soak temperatures to maintain a substantially constant burning rate of the propellant.

Another object of the present invention is the provision of a regulating system for a gas generator in which the burning rate is regulated by controlling the flow of exhaust gases from the generator.

A further object is to provide apparatus for regulating the output of a gas generator burning a solid fuel and oxidizer combination wherein the burning rate of the combination increases with pressure and soak temperature. The burning rate is regulated by controlling the flow of reaction gases from the combustion chamber of the generator to adjust the pressure therein.

Still another object of the invention is the provision of a regulating arrangement for solid propellant propulsion devices detecting the pressure in the inlet to an exhaust nozzle connected to the outlet of the combustion chamber of the devices and controlling the volumetric flow of reaction gases from the chamber directly with the pressures in said inlet.

Another object of the present invention is the provision of a regulating arrangement for solid propellant propulsion devices in which the weight flow of the propellant is regulated by a combustion chamber having an outlet and an exhaust nozzle having an inlet connected to said outlet wherein the flow of reaction gases from the chamber is regulated according to gas pressures in the nozzle inlet.

Other objects and features of the invention will become apparent to those skilled in the art as the disclosure is made in the following detailed description of a preferred embodiment of the invention as illustrated in the accompanying sheet of drawing.

The single FIGURE shows the regulating device in accordance with this invention.

Referring to the drawing, there is shown a solid propellant propulsion device including a combustion chamber 10 having an exhaust outlet conduit 12 for passing reaction gases produced in the chamber to an inlet conduit 14 of an exhaust or turbine nozzle 16. An igniter assembly 17 is secured in the forward end of the walls of the combustion chamber by a pressure-tight seal, passing conductors which are connected to a filament disposed in the primer of the igniter assembly located inside the combustion chamber. The turbine nozzle directs the flow of gases against impeller blades 18 of a turbine wheel, a section of which is shown schematically in the drawing.

A typical pressure control valve 20 has been shown for regulating the flow of exhaust gases from the outlet conduit of the combustion chamber to the inlet conduit of the turbine nozzle. As shown, the pressure control valve includes a cylinder 22 housing a piston and guiding it for reciprocal movement in response to pressure variations in the inlet conduit. The chamber formed by this cylinder 22 is connected to the interior of the inlet conduit by channels formed in the inner periphery of a neck 26 which provides a guide for a valve stem 28. One end of the valve stem is tapered to project in the opposing valve port between the exhaust outlet conduit 12 and the inlet conduit 14.

The other end of the valve stem projects into the valve chamber and is connected to a piston 24. The valve stem is moved reciprocally along with the piston in response to pressure variations in the valve chamber to control the flow of reaction gases through a main valve port 19. A compression coil spring 30 is disposed between the piston and a screw plug 32 which is threaded in the end of the cylinder 22. The spring bias tends to seat the operative end of the valve stem in the main valve port while the gas pressure in the inlet exerts a force on the piston tending to unseat the end of the valve stem opening the valve port against the force of the spring bias.

A by-pass valve port 40 has been shown in the preferred arrangement to regulate the minimum flow of reaction gases from the outlet conduit of the combustion chamber to the inlet 14 of the turbine nozzle. The minimum flow of gases through the system is adjusted by a needle valve 42 threaded in an opening in the outlet conduit opposite the by-pass valve port and projecting outside the conduit to be readily accessible for adjustment. Adjustment of the needle valve controls the minimum flow of gases while permitting the closing of the main port through which the flow of exhaust gases is regulated by the pressure control valve 20.

In the operation of the solid propellant propulsion device of the preferred embodiment of the invention, the pressure control valve 20 is responsive to gas pressures in the nozzle inlet to regulate the flow of gases from the combustion chamber to the nozzle. The pressure control valve 20 regulates the flow of the exhaust gases through the main valve port as a function of pressure in the nozzle inlet.

Since the performance of a propellant charge in a propulsion device is sensitive to ambient temperature variations and such temperature variations materially affect the performance of the propulsion unit, temperature variations of the propellant charge at the time of combustion must be compensated for to regulate the power output of the device. In order to provide for a regulated power output, the burning rate of the propellant charge in the combustion chamber is controlled by regulating the pressure in the combustion chamber. A propellant charge having a soak temperature which varies with ambient temperatures burns at a rate determined primarily by pressure in the combustion chamber. The burning of the propellant will produce reaction gases which are passed through the exhaust conduit 12 to the inlet conduit 14 to produce a pressure in the nozzle inlet which can be readily detected to control the flow of gases through the main valve port 19. In the event that the pressure in the inlet conduit 14 is below a preselected value, which is adjusted by the screw plug 32, the force of the spring 30 will move the piston against the force produced by the gas pressure in the valve chamber to position the tapered end of the valve stem in the main valve port decreasing the flow of the exhaust gases through the main valve port. The decrease in flow of the exhaust gases through the valve port produces an accumulation of reaction gases in the combustion chamber to increase the pressure therein. Since the burning rate and weight flow of the propellant is increased with pressure in the combustion chamber, the generation of gases will be increased at an increasing rate as the pressure in the chamber increases.

As the pressure in the combustion chamber increases, the burning rate is increased to further increase the pressure in the chamber at an increasing rate. The resulting higher pressures in the exhaust conduit increase the flow of gases through both the main valve port 19 and the by-pass valve port tending to increase the pressure in the inlet conduit. As the pressure detector section of the control valve senses the increase in inlet pressure, the valve stem is backed off from the valve port by the force of the gas pressure in the valve chamber on the piston to increase the flow of gases through the port 19. Thus, the inlet pressure is regulated to the preselected pressure of the pressure control valve.

In the regulating arrangement disclosed by the preferred embodiment, the power output, burning rate or propellant weight flow of a solid propellant gas generator is regulated by controlling the pressure in the combustion chamber. The output is detected by sensing the inlet pressure to the exhaust nozzle. The inlet pressure is compared with a preselected pressure by the pressure control valve. The result of the comparison produces a resultant force acting on the piston which positions the valve stem in the valve port 19 controlling the flow of reaction gases through the port thereby controlling the pressure in the combustion chamber.

If the inlet pressure to the turbine nozzle is below the pressure selected by the pressure control valve, the pressure control valve will move the stem to decrease the flow of exhaust gases through the valve port. The decrease in flow of exhaust gases increases the pressure in the combustion chamber which in turn increases the burning rate and the rate of generation of reaction gases. Although the positioning of the valve stem in the port previously had decreased the flow of exhaust gases, from the combustion chamber to the nozzle, the increase in pressure in the combustion chamber and outlet conduit will tend to increase the flow through the valve port opening, tending to increase the inlet pressure to the turbine nozzle, causing the pressure control valve to readjust the valve port opening in accordance with the comparison of the inlet pressure and the preselected control valve pressure.

On inlet pressure to the turbine nozzle above the preselected pressure of the pressure control valve will operate the valve to decrease the pressure in the combustion chamber to decrease the burning rate and the rate of generation of reaction gases in the combustion chamber. Regulation of the inlet pressures to the turbine nozzle produces a regulated output for the propulsion device whereby not only the output of solid propellant propulsion devices can be accurately controlled but also the firing duration or burning period will be capable of being accurately controlled.

In the light of the above teachings, various modifications and variations of the present invention are contemplated and are apparent to those skilled in the art without departing from the spirit and scope of the invention.

I claim:

1. In combination, a solid propellant gas generator including a combustion chamber for housing and burning solid propellants at a preselected burning rate to produce a preselected propellant weight flow, an outlet from said chamber, a nozzle having an inlet connected to said outlet, pressure control means for detecting and maintaining the weight flow of the propellant including valve means disposed in said outlet for controlling the flow of reaction gases from the chamber, and pressure sensing means disposed in said inlet downstream of said valve means and responsive to decreasing gas pressures below a preselected pressure to decrease the flow of reaction gases from said chamber and increase the pressure in the combustion chamber whereby the burning rate and propellant weight flow is increased to said preselected burning rate and propellant weight flow.

2. In combination, a solid propellant gas generator including a combustion chamber for housing and burning solid propellants at a preselected burning rate to produce a preselected propellant weight flow, an outlet from said chamber, a nozzle having an inlet connected to said outlet, pressure control means for maintaining the preselected weight flow of the propellant including valve means disposed in said outlet for controlling the flow of reaction gases from the combustion chamber, and pressure sensing means disposed in said inlet downstream of said valve means and responsive to increasing gas pressures above a preselected pressure to increase the flow of reaction gases from the combustion chamber and decrease the pressure in the combustion chamber whereby the burning rate and propellant weight flow is decreased to said preselected burning rate and propellant weight flow.

3. In combination with solid propellant propulsion devices including a combustion chamber having an outlet and a nozzle having an inlet connected to said outlet, regulating means comprising pressure sensing means connected to the nozzle inlet, valve means disposed in said outlet upstream of said sensing means and connected to said pressure sensitive means for regulating the flow of reaction gases to maintain a substantially constant nozzle inlet pressure by varying the pressure in the combustion chamber to regulate the burning rate of the solid propellant in the chamber.

4. A regulating system for solid propellant gas generators comprising in combination; a solid propellant charge having a burning rate varying as a function of temperature, a solid propellant combustion chamber for housing said charge, a turbine nozzle, conduit means connecting the interior of said chamber to said nozzle, and regulating means including means for sensing the inlet pressure of exhaust gases to said nozzle and means upstream of sensing means controlling the rate of flow of the gases from the combustion chamber to maintain the nozzle inlet pressure substantially constant by varying the pressure within the chamber to regulate the burning rate of the charge.

5. A regulating system for solid propellant gas generators comprising in combination; a solid propellant charge having a predetermined configuration, a solid propellant combustion chamber for said charge having an exhaust outlet for reaction gases formed in said chamber, a turbine nozzle having an inlet connected to said exhaust outlet, and regulating means disposed intermediate said inlet and outlet, said regulating means including means for sensing the exhaust gas pressure at the nozzle inlet and valve means upstream of said sensing means for controlling the rate of flow of the reaction gas from the combustion chamber through the exhaust outlet as a function of the nozzle inlet pressure for adjusting the pressure in the chamber to regulate the burning rate of said solid propellant charge and maintain a substantially constant nozzle inlet pressure.

6. In combination, a combustion chamber for generating working gas, an outlet from said chamber, a nozzle for said gas having an inlet and an outlet, means connecting said nozzle inlet to said chamber outlet to conduct all of said working gas from said combustion chamber to said nozzle inlet, single valve means automatically actuated so as to control the flow of gas through said connecting means, and means responsive to the pressure at said nozzle inlet for actuating said valve means to control the flow of gas for regulating the pressures in said chamber outlet and combustion chamber.

7. In combination, a combustion chamber for generating working gas, an outlet from said chamber, a nozzle for said gas having an inlet and an outlet, means connecting said nozzle inlet to said chamber outlet to conduct all of said working gas from said combustion chamber to said nozzle inlet, single valve means automatically actuated so as to control the flow of gas through said connecting means, and means responsive to the pressure at said nozzle inlet for actuating said valve means to control the flow of gas for regulating the pressures in said chamber outlet and combustion chamber, said pressure responsive means controlling said valve means in a sense to decrease the valve throttling action upon increase in nozzle inlet pressure.

8. In combination, a combustion chamber for generating working gas, an outlet from said chamber, a nozzle for said gas having an inlet and an outlet, means connecting said nozzle inlet to said chamber outlet to conduct all of said working gas from said combustion chamber to said nozzle inlet, single valve means automatically actuated so as to control the flow of gas through said connecting means, and means responsive to the pressure at said nozzle inlet for actuating said valve means to control the flow of gas for regulating the pressures in said chamber outlet and combustion chamber, and by-pass means for said valve means for passing a metered flow of gas therearound independent of the valve position.

References Cited in the file of this patent

UNITED STATES PATENTS

| | | |
|---|---|---|
| 2,152,972 | Pescara | Apr. 4, 1939 |
| 2,489,953 | Burney | Nov. 29, 1949 |
| 2,552,497 | Roach et al. | May 8, 1951 |
| 2,583,570 | Hickman | Jan. 29, 1952 |
| 2,842,937 | Clark | July 15, 1958 |
| 2,869,321 | Welch et al. | Jan. 20, 1959 |
| 2,922,050 | Loughran | Feb. 7, 1961 |